(12) United States Patent
Clum et al.

(10) Patent No.: US 10,760,432 B2
(45) Date of Patent: Sep. 1, 2020

(54) AIRFOIL HAVING FLUIDLY CONNECTED HYBRID CAVITIES

(71) Applicant: United Technologies Corporation, Farmington, CT (US)

(72) Inventors: Carey Clum, East Hartford, CT (US); Timothy J. Jennings, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 207 days.

(21) Appl. No.: 15/723,461

(22) Filed: Oct. 3, 2017

(65) Prior Publication Data

US 2019/0101005 A1    Apr. 4, 2019

(51) Int. Cl.
*F01D 5/18* (2006.01)
*F01D 9/06* (2006.01)
(Continued)

(52) U.S. Cl.
CPC ............ *F01D 5/186* (2013.01); *B22C 9/10* (2013.01); *B22C 9/22* (2013.01); *B22C 9/24* (2013.01);
(Continued)

(58) Field of Classification Search
CPC ..... F05D 2260/22141; F05D 2260/202; F05D 2260/201; F01D 5/189; F01D 5/188; F01D 5/18; F01D 5/187; F01D 5/186
See application file for complete search history.

(56) References Cited

U.S. PATENT DOCUMENTS

| 5,117,626 A * | 6/1992 | North | F01D 5/186 |
| | | | 416/96 R |
| 6,416,284 B1 * | 7/2002 | Demers | F01D 5/186 |
| | | | 415/115 |

(Continued)

FOREIGN PATENT DOCUMENTS

| EP | 2107215 A1 | 10/2009 |
| EP | 3056672 A1 | 8/2016 |

(Continued)

OTHER PUBLICATIONS

European Search Report for Application No. 18198488.1, International Filing date Oct. 3, 2018, dated Jan. 30, 2019, 11 pages.

(Continued)

*Primary Examiner* — Igor Kershteyn
*Assistant Examiner* — Andrew Thanh Bui
(74) *Attorney, Agent, or Firm* — Cantor Colburn LLP (57) ABSTRACT

Airfoils having a leading edge and a trailing edge, with a plurality of cavities therein including a leading edge hybrid cavity extending in a radial direction between a first end and a second end of the airfoil body along the leading edge. An airfoil side hybrid cavity is located toward the trailing edge relative to the leading edge hybrid cavity and positioned adjacent a side wall of the airfoil body. The airfoil side hybrid cavity extends in a radial direction between the first end and the second end and a divider rib extends radially between the first end and the second end along the side wall of the airfoil between the airfoil side hybrid cavity and the leading edge hybrid cavity. At least one first cross-over hole is formed within the divider rib to fluidly connect the airfoil side hybrid cavity to the leading edge hybrid cavity.

12 Claims, 6 Drawing Sheets

(51) Int. Cl.
*B22C 9/10* (2006.01)
*B22C 13/10* (2006.01)
*B22C 9/22* (2006.01)
*B22C 9/24* (2006.01)

(52) U.S. Cl.
CPC .............. *B22C 13/10* (2013.01); *F01D 5/187* (2013.01); *F01D 9/065* (2013.01); *F05D 2230/211* (2013.01); *F05D 2260/202* (2013.01); *F05D 2260/205* (2013.01)

(56) References Cited

U.S. PATENT DOCUMENTS

| | | | |
|---|---|---|---|
| 8,057,183 B1 | 11/2011 | Liang | |
| 8,070,443 B1 | 12/2011 | Liang | |
| 8,231,349 B2* | 7/2012 | Naik | F01D 5/186 |
| | | | 416/97 R |
| 8,366,395 B1 | 2/2013 | Liang | |
| 2008/0080979 A1 | 4/2008 | Brassfield et al. | |
| 2012/0063891 A1 | 3/2012 | Kruckels et al. | |
| 2016/0230565 A1* | 8/2016 | King | F01D 5/187 |

FOREIGN PATENT DOCUMENTS

| | | |
|---|---|---|
| EP | 3098385 A1 | 11/2016 |
| WO | 2015195086 A1 | 12/2015 |

OTHER PUBLICATIONS

European Office Action for Application No. 18198488.1, International Filing date Oct. 3, 2018, dated Jan. 14, 2020, 4 pages.

\* cited by examiner

AIRFOIL HAVING FLUIDLY CONNECTED HYBRID CAVITIES

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Airfoils may incorporate various cooling cavities located adjacent external side walls. Such cooling cavities are subject to both hot material walls (exterior or external) and cold material walls (interior or internal). Although such cavities are designed for cooling portions of airfoil bodies, various cooling flow characteristics can cause hot sections where cooling may not be sufficient. Accordingly, improved means for providing cooling within an airfoil may be desirable.

BRIEF DESCRIPTION

According to some embodiments, airfoils for gas turbine engines are provided. The airfoils include an airfoil body having a plurality of cavities formed therein, the airfoil extending in a radial direction between a first end and a second end, and extending axially between a leading edge and a trailing edge, wherein the plurality of cavities comprise a leading edge hybrid cavity formed within the airfoil body extending in a radial direction between the first end and the second end of the airfoil body along the leading edge, and an airfoil side hybrid cavity located toward the trailing edge of the airfoil body relative to the leading edge hybrid cavity, the airfoil side hybrid cavity positioned adjacent a side wall of the airfoil body, wherein the airfoil side hybrid cavity extends in a radial direction between the first end and the second end of the airfoil body, and a divider rib extending radially between the first end and the second end of the airfoil body along the side wall of the airfoil body between the airfoil side hybrid cavity and the leading edge hybrid cavity. At least one first cross-over hole is formed within the divider rib to fluidly connect the airfoil side hybrid cavity to the leading edge hybrid cavity.

In addition to one or more of the features described herein, or as an alternative, further embodiments of the airfoils may include that the at least one first cross-over hole comprises a plurality of first cross-over holes formed within the divider rib.

In addition to one or more of the features described herein, or as an alternative, further embodiments of the airfoils may include that the plurality of first cross-over holes are distributed uniformly along a radial length of the divider rib.

In addition to one or more of the features described herein, or as an alternative, further embodiments of the airfoils may include that a density of first cross-over holes within the divider rib is higher proximate the second end of the airfoil body than proximate the first end of the airfoil body.

In addition to one or more of the features described herein, or as an alternative, further embodiments of the airfoils may include that the at least one first cross-over hole is angled in a forward, radial direction such that an airflow from the airfoil side hybrid cavity flows into the leading edge hybrid cavity.

In addition to one or more of the features described herein, or as an alternative, further embodiments of the airfoils may include that the airfoil side hybrid cavity is a pressure side hybrid cavity located on a pressure side of the airfoil body.

In addition to one or more of the features described herein, or as an alternative, further embodiments of the airfoils may include a second airfoil side hybrid cavity located adjacent a suction side of the airfoil body, the second airfoil side hybrid cavity separated from the leading edge hybrid cavity by a second divider rib.

In addition to one or more of the features described herein, or as an alternative, further embodiments of the airfoils may include at least one second cross-over hole formed in the second divider rib and fluidly connecting the second airfoil side hybrid cavity to the leading edge hybrid cavity.

In addition to one or more of the features described herein, or as an alternative, further embodiments of the airfoils may include an interior cavity within the airfoil body and located aft of the leading edge hybrid cavity, the interior cavity providing a cold wall to each of the leading edge hybrid cavity and the airfoil side hybrid cavity.

In addition to one or more of the features described herein, or as an alternative, further embodiments of the airfoils may include at least one resupply hole fluidly connecting the interior cavity with the leading edge hybrid cavity.

In addition to one or more of the features described herein, or as an alternative, further embodiments of the airfoils may include at least one heat transfer augmentation feature within at least one of the leading edge hybrid cavity and the airfoil side hybrid cavity.

According to some embodiments, core structures for manufacturing airfoils for gas turbine engines are provided. The core structures include a leading edge hybrid core extending in a radial direction between a first end and a second end, the a leading edge hybrid core arranged to form a leading edge and a leading edge hybrid cavity within an airfoil body, an airfoil side hybrid core positioned aft of the leading edge hybrid core, the airfoil side hybrid core positioned to form a side wall of the airfoil body and an airfoil side hybrid cavity within the airfoil body, wherein the airfoil side hybrid core extends in a radial direction between the first end and the second end adjacent the leading edge hybrid core, and at least one first cross-over stem connecting the airfoil side hybrid core to the leading edge core, wherein the at least one first cross-over stem is arranged to form a cross-over hole within a rib that separates the leading edge hybrid cavity and the airfoil side hybrid cavity.

In addition to one or more of the features described herein, or as an alternative, further embodiments of the core structures may include that the at least one first cross-over stem comprises a plurality of first cross-over stems connecting the leading edge hybrid core to the airfoil side hybrid core.

In addition to one or more of the features described herein, or as an alternative, further embodiments of the core structures may include that the plurality of first cross-over stems are distributed uniformly between the first end and the second end.

In addition to one or more of the features described herein, or as an alternative, further embodiments of the core structures may include that a density of first cross-over stems is higher proximate the second end than proximate the first end.

In addition to one or more of the features described herein, or as an alternative, further embodiments of the core structures may include that the at least one first cross-over stem is angled in a forward, radial direction such that a formed cross-over hole enables airflow from a formed airfoil side hybrid cavity into a formed leading edge hybrid cavity.

In addition to one or more of the features described herein, or as an alternative, further embodiments of the core structures may include that the airfoil side hybrid core is a pressure side hybrid core located to form a pressure side hybrid cavity within a formed airfoil body.

In addition to one or more of the features described herein, or as an alternative, further embodiments of the core structures may include a second airfoil side hybrid core located adjacent the leading edge hybrid core and connected to the leading edge hybrid core by at least one second cross-over stem to form fluid connections between a formed second airfoil side hybrid cavity and a formed leading edge hybrid cavity.

According to some embodiments, gas turbine engines are provided. The gas turbine engines include at least one airfoil having an airfoil body having a plurality of cavities formed therein, the airfoil extending in a radial direction between a first end and a second end, and extending axially between a leading edge and a trailing edge, wherein the plurality of cavities comprise a leading edge hybrid cavity formed within the airfoil body extending in a radial direction between the first end and the second end of the airfoil body along the leading edge, and an airfoil side hybrid cavity located toward the trailing edge of the airfoil body relative to the leading edge hybrid cavity, the airfoil side hybrid cavity positioned adjacent a side wall of the airfoil body, wherein the airfoil side hybrid cavity extends in a radial direction between the first end and the second end of the airfoil body, and a divider rib extending radially between the first end and the second end of the airfoil body along the side wall of the airfoil body between the airfoil side hybrid cavity and the leading edge hybrid cavity. At least one first cross-over hole is formed within the divider rib to fluidly connect the airfoil side hybrid cavity to the leading edge hybrid cavity.

In addition to one or more of the features described herein, or as an alternative, further embodiments of the gas turbine engines may include that the at least one first cross-over hole is angled in a forward, radial direction such that an airflow from the airfoil side hybrid cavity flows into the leading edge hybrid cavity.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
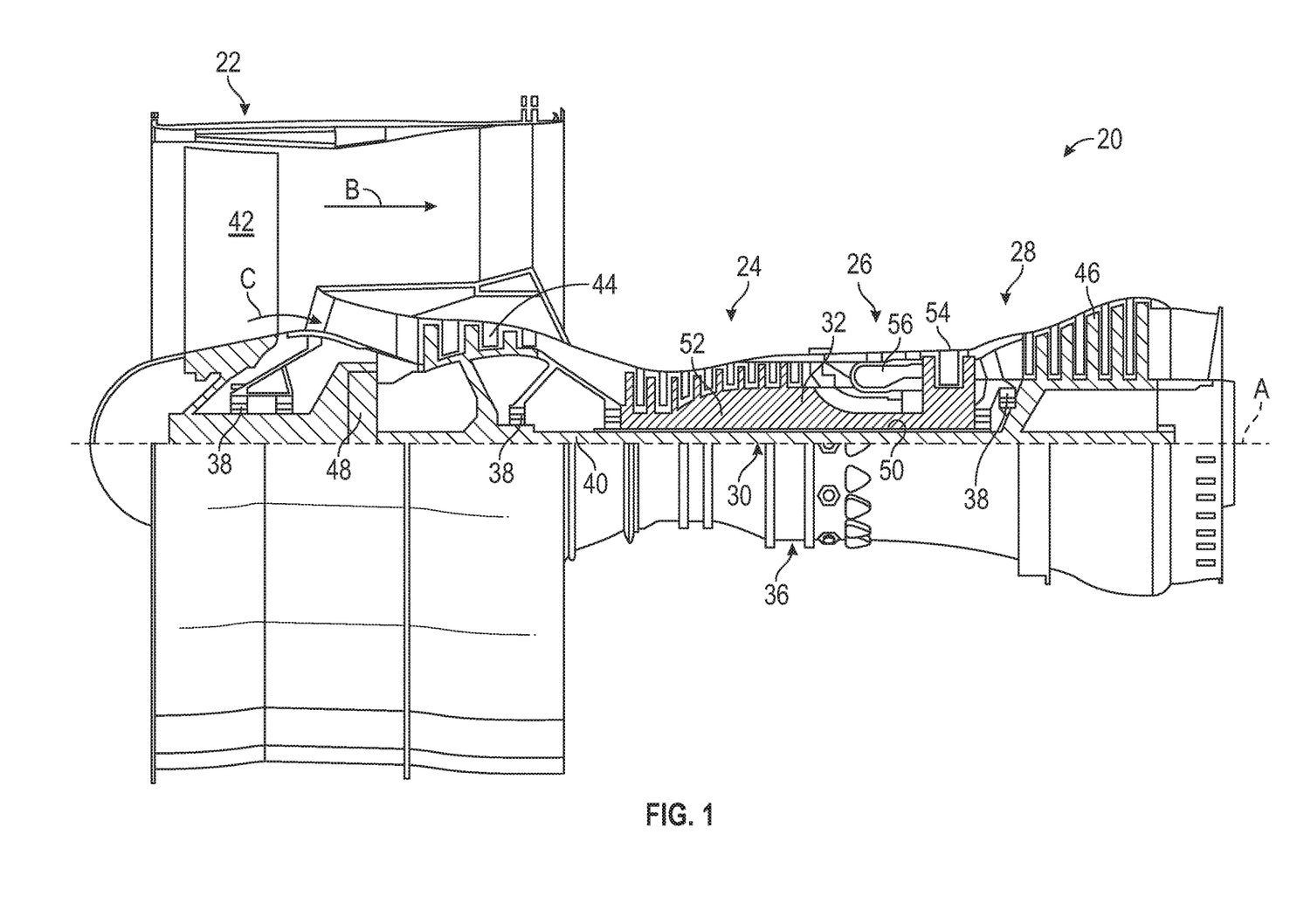
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram} \degree \text{R})/(514.7\degree \text{R})]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, and three-spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
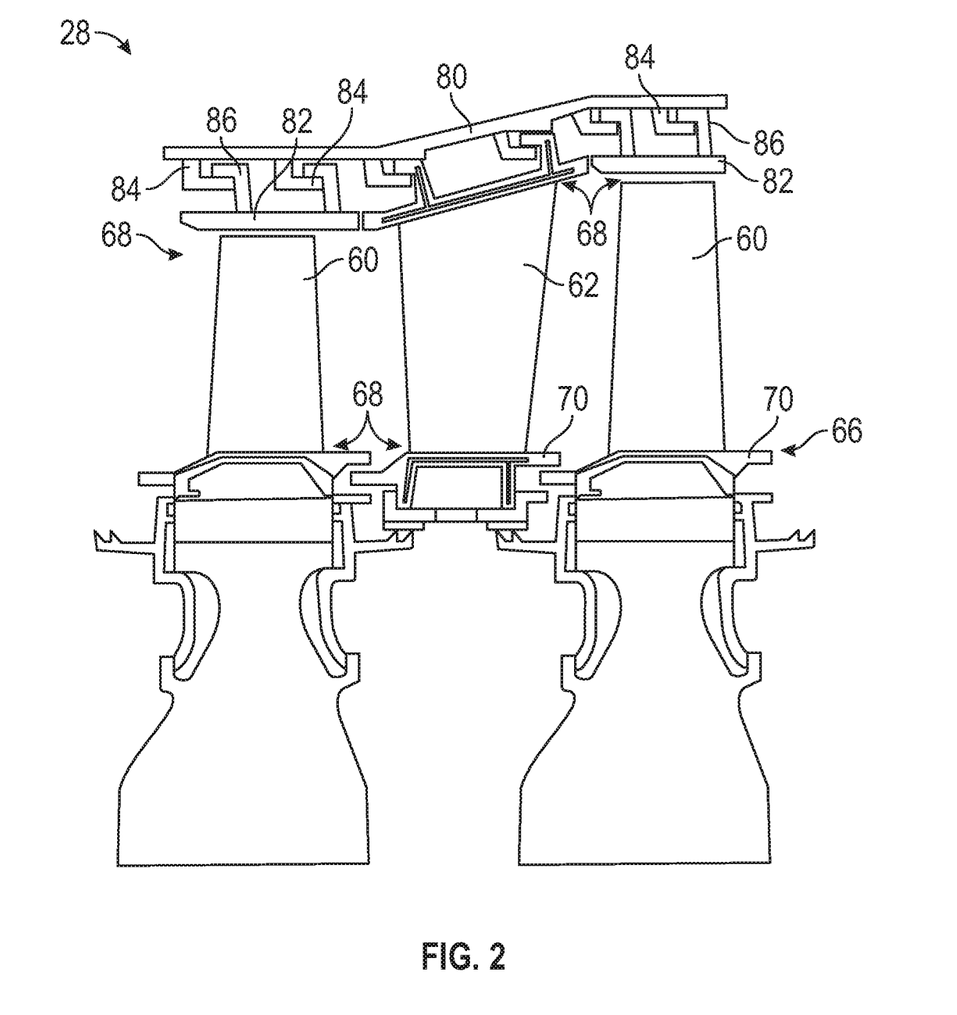
FIG. 2 is a schematic illustration of a portion of a turbine section of the gas turbine engine of FIG. 1.

FIG. 2 is a schematic view of a portion of the turbine section 28 that may employ various embodiments disclosed herein. Turbine section 28 includes a plurality of airfoils 60, 62 including, for example, one or more blades and vanes. The airfoils 60, 62 may be hollow bodies with internal cavities defining a number of channels or cores, hereinafter airfoil cores, formed therein and extending between an inner diameter 66 and an outer diameter 68, or vice-versa. The airfoil cores may be separated by partitions within the airfoils 60, 62 that may extend either from the inner diameter 66 or the outer diameter 68 of the airfoil 60, 62. The partitions may extend for a portion of the length of the airfoil 60, 62, but may stop or end prior to forming a complete wall within the airfoil 60, 62. Thus, each of the airfoil cores may be fluidly connected and form a fluid path within the respective airfoil 60, 62. The airfoils 60, 62 may include platforms 70 located proximal to the inner diameter 66 thereof. Located below the platforms 70 (e.g., radially inward with respect to the engine axis) may be airflow ports and/or bleed orifices that enable air to bleed from the internal cavities of the airfoils 60, 62. A root of the airfoil may connect to or be part of the platform 70.

The turbine section 28 is housed within a case 80, which may have multiple parts (e.g., turbine case, diffuser case, etc.). In various locations, components, such as seals, may be positioned between airfoils 60, 62 and the case 80. For example, as shown in FIG. 2, blade outer air seals 82 (hereafter "BOAS") are located radially outward from the blade 60. As will be appreciated by those of skill in the art, the BOAS 82 may include BOAS supports that are configured to fixedly connect or attach the BOAS 82 to the case 80 (e.g., the BOAS supports may be located between the BOAS 82 and the case 80). As shown in FIG. 2, the case 80 includes a plurality of case hooks 84 that engage with BOAS hooks 86 to secure the BOAS 82 between the case 80 and a tip of the airfoil 60.

Figure 3:
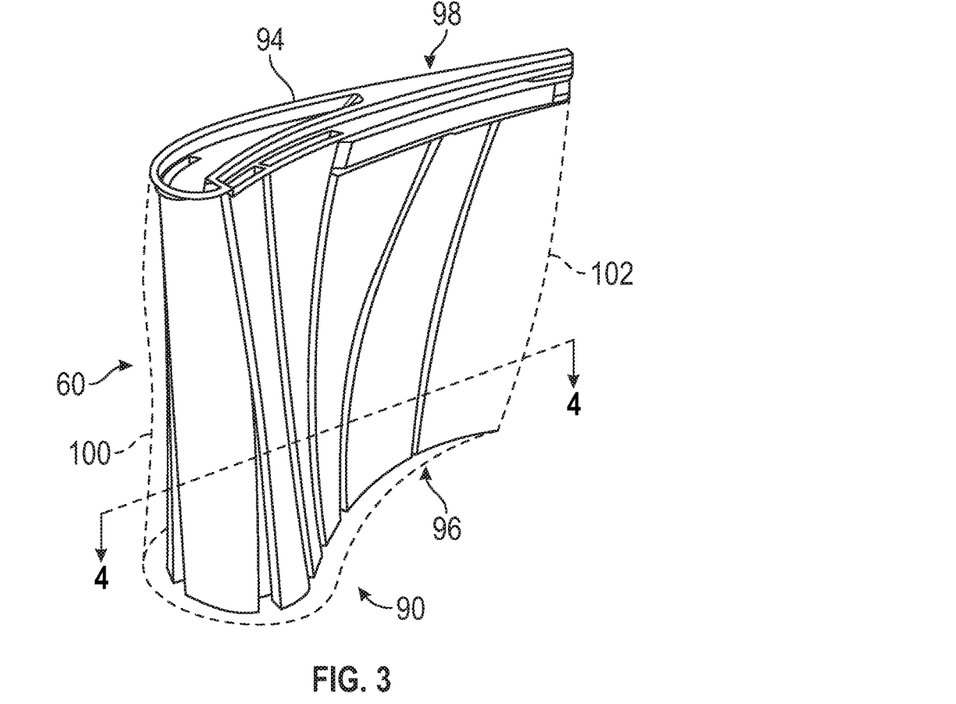
FIG. 3 is a perspective view of an airfoil that can incorporate embodiments of the present disclosure.
Figure 4:
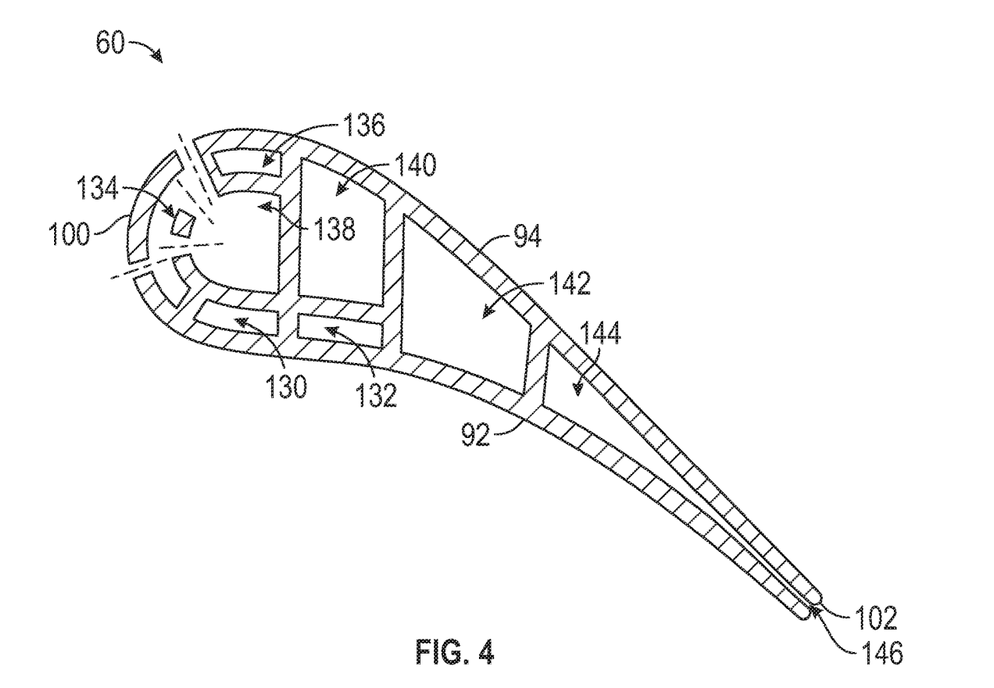
FIG. 4 is a partial cross-sectional view of the airfoil of FIG. 3 as viewed along the line 4-4 shown in FIG. 3.

As shown in FIGS. 3-4, the airfoil 60 includes an airfoil body 90 having a pressure side 92, a suction side 94, a root region 96, a tip region 98, a leading edge 100, and a trailing edge 102. The pressure side 92 is disposed opposite the suction side 94. The pressure side 92 and the suction side 94 each extend radially between the root region 96 and the tip region 98. As used herein, the term "radial" refers to radial with respect to an engine axis (e.g., engine central longitudinal axis A shown in FIG. 1). The pressure side 92 and the suction side 94 each extend generally axially and/or tangentially (e.g., with respect to the engine axis) between the leading edge 100 and the trailing edge 102. Each of the root region 96 and the tip region 98 extend between the leading edge 100 and the trailing edge 102 opposite each other at ends of the airfoil body 90 in the radial direction. That is, the root region 96 defines an inner radial end of the airfoil body 90 and the tip region defines an outer radial end of the airfoil body 90 (relative to an engine axis). The airfoil 60 may be a blade or vane, and have various other features associated with such configurations, e.g., platforms, tip surfaces, etc.

As shown in FIG. 4, illustrating a cross-sectional view of the airfoil 60 as viewed along the line 4-4 shown in FIG. 3, the airfoil body 90 defines or includes a plurality of internal cavities to enable cooling of the airfoil 60. For example, as shown, the airfoil 60 includes a plurality of forward and side cooling cavities 130, 132, 134, 136, 138. In the relative middle of the airfoil body 90, the airfoil 60 includes various serpentine flow cavities 140, 142, 144 and, at the trailing edge 102, a trailing edge slot 146. The most aftward (aft-flowing) serpentine flow cavity 144 defines a serpentine trailing edge core that fluidly connects to the trailing edge slot 146 that is formed at the trailing edge 102. In the present illustration, a first serpentine cavity 140 may arranged for flow in a first direction (e.g., an up pass cooling flow), a second serpentine cavity 142 may be arranged for flow in a second direction (e.g., a down pass cooling flow), and a third serpentine cavity 144 may be arranged for flow in the first direction and/or a third direction (e.g., an up pass cooling flow that exits the airfoil 60 through the trailing edge slot 146). Although shown with a specific internal cooling cavity arrangement, airfoils in accordance with the present disclosure may include additional and/or alternative cavities, flow paths, channels, etc. as will be appreciated by those of skill in the art, including, but not limited to, tip cavities, serpentine cavities, trailing edge cavities, etc.

In airfoils that use hybrid cavity technology as described above, there is a challenge to balance the flow through adjacent hybrid cavities. Some cavities need less air than what is metered into the cavities through film holes. To address this, a meter plate can be positioned at the beginning (inlet) of the cavity/circuit. The metering plate can cause pressure losses and lead to inefficiencies. Such cavities can include pressure and/or suction side cavities (e.g., cavities 130, 132, 136 shown in FIG. 4). An opposite issue can arise within a leading hybrid cavity (e.g., cavity 134 shown in FIG. 4) where the leading edge cavity may require additional air/air pressure near the tip. This can be a problem in, for example, a forward-flowing serpentine cavity configuration because the forward-flowing serpentine does not have enough pressure to resupply a leading edge cavity. As used herein, a "hybrid cavity" is an internal cavity of an airfoil that has one wall that is a hot wall (e.g., exterior surface of an airfoil body and exposed to hot, gaspath air) and another wall that is a cold wall (e.g., a wall that is not exposed to the hot gaspath air, and may be an internal or interior wall structure of the airfoil).

Embodiments of the present disclosure are directed to balancing the flow amongst different hybrid cavities in an airfoil, and particularly at the leading edge of the airfoil. In accordance with some embodiments, a pressure side hybrid cavity and/or a suction side hybrid is/are used to resupply the leading edge hybrid cavity. In some such embodiments, the leading edge resupply can be provided in a preferential way near the tip of the airfoil. Leading edge cavity resupply as provided herein can pull additional air into the leading edge cavity from the pressure side and/or suction side hybrid cavities, which in turn can increase the pressure loss and allow the airflow into the pressure/suction side hybrid cavities to be metered at a cavity exit instead of using a meter plate. Airfoil cavity arrangements of the present disclosure can decrease heat pick up in the leading edge hybrid cavity at the root as well as decrease a pressure drop in a black-flow margin limited region.

Figure 5A:
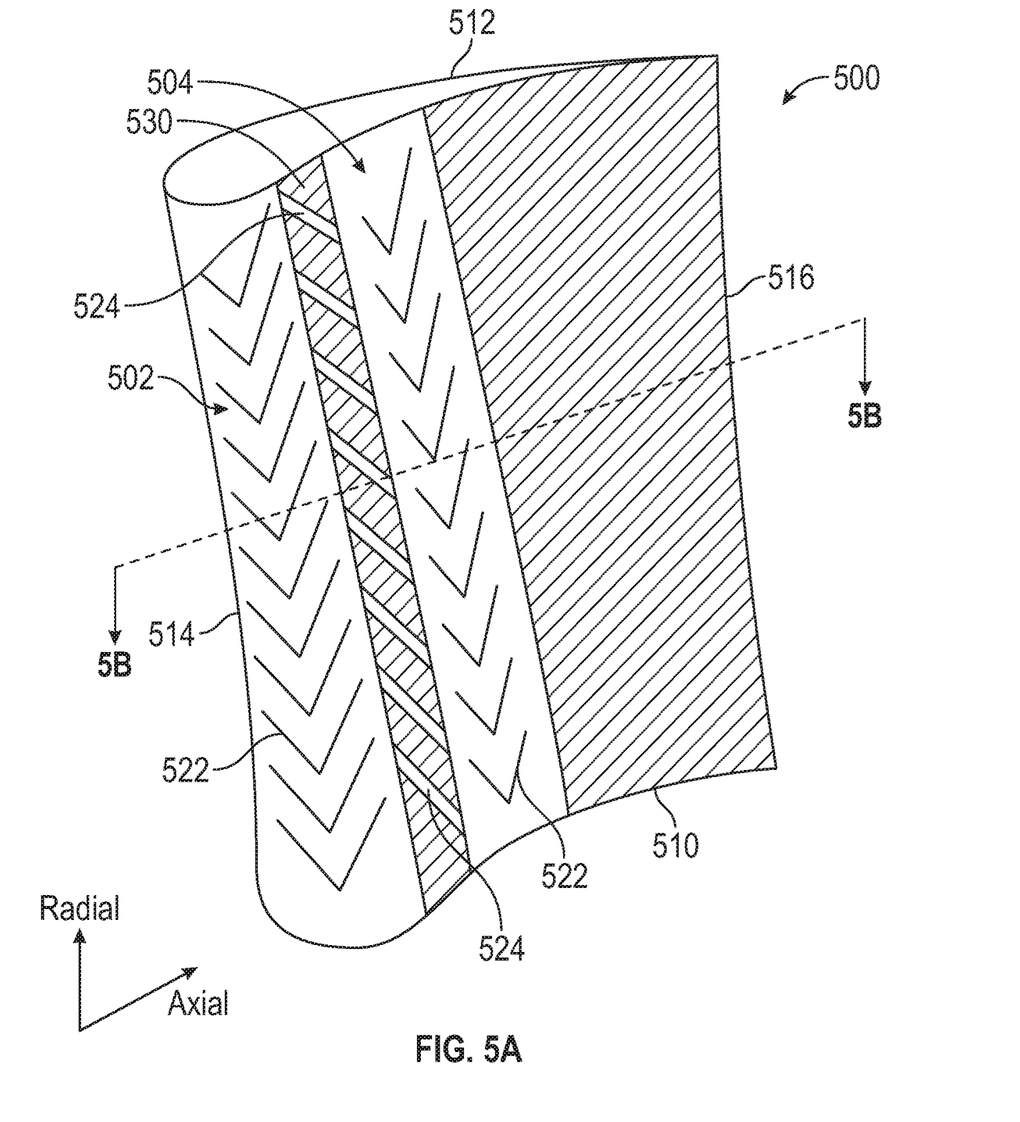
FIG. 5A is an isometric illustration showing internal structures of an airfoil in accordance with an embodiment of the present disclosure.
Figure 5B:
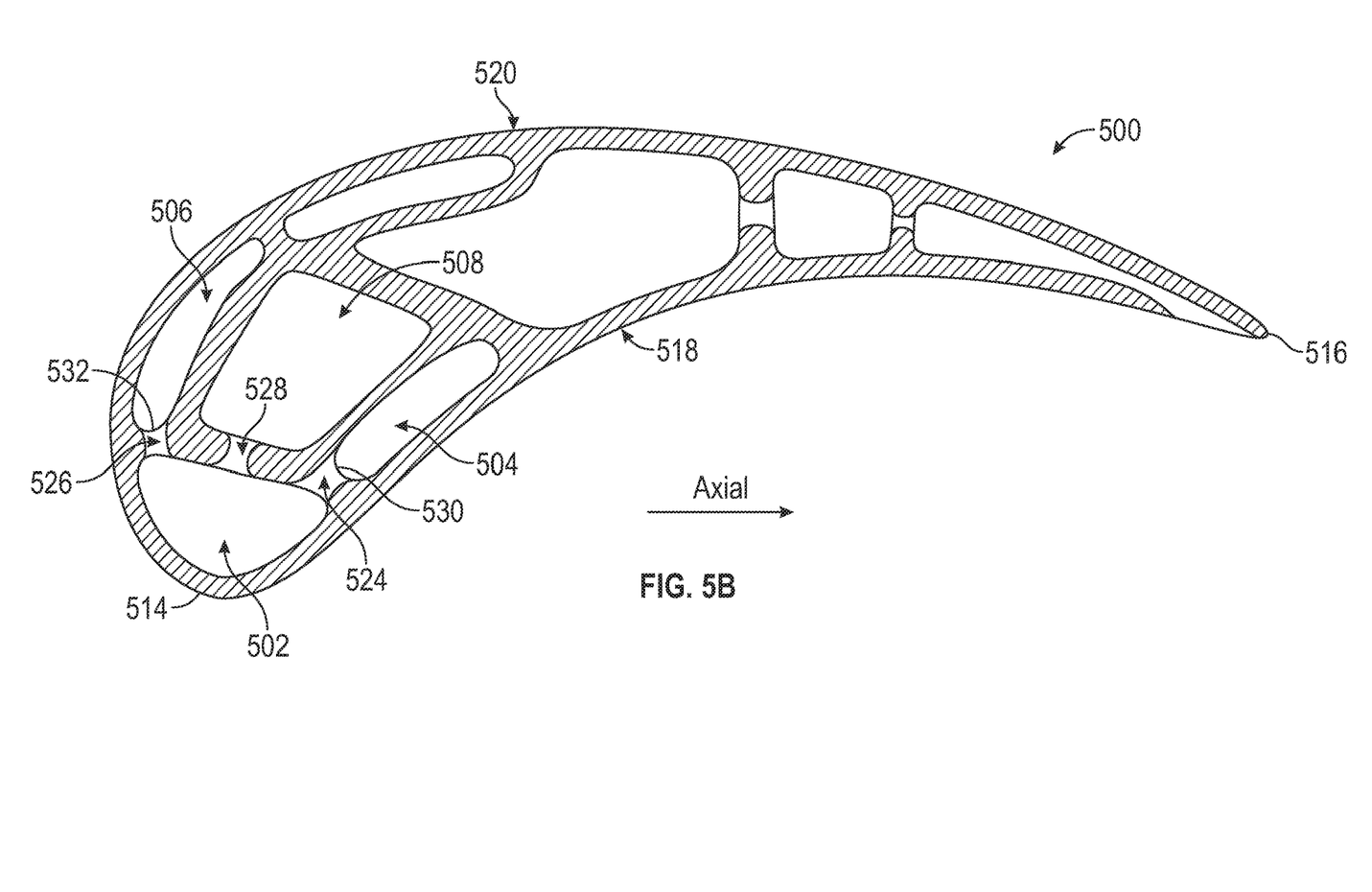
FIG. 5B is a cross-sectional view of the airfoil of FIG. 5A as viewed along the line B-B shown in FIG. 5A, showing an internal structure of the airfoil.

Turning to FIGS. 5A-5B, schematic illustrations of an airfoil 500 in accordance with an embodiment of the present disclosure are shown. FIG. 5A is an isometric illustration showing internal structures of the airfoil 500, including a leading edge hybrid cavity 502 and a pressure side hybrid cavity 504. FIG. 5B is a cross-sectional view of the airfoil 500 as viewed along the line B-B shown in FIG. 5A, showing an internal structure of the airfoil 500 including the leading edge hybrid cavity 502, the pressure side hybrid cavity 504, and a suction side hybrid cavity 506. The leading edge hybrid cavity 502, the pressure side hybrid cavity 504, and the suction side hybrid cavity 506 are all "hybrid cavities" because one wall of the cavity is exposed to hot, gaspath air and another wall is a cold wall that is internal to the structure of the airfoil 500. For example, as shown in FIG. 5B, each of the leading edge hybrid cavity 502, the pressure side hybrid cavity 504, and the suction side hybrid cavity 506 have a cold wall that is adjacent a cold, interior cavity 508.

The airfoil 500 extends radially between a first end 510 (e.g., a root or base of the airfoil 500) and a second end 512 (e.g., a tip of the airfoil 500). Further, the airfoil 500 extends axially between a leading edge 514 and a trailing edge 516. The leading edge hybrid cavity 502 runs radially between the first end 510 and the second end 512 within the airfoil 500 at the leading edge 514. The pressure side hybrid cavity 504 runs radially between the first end 510 and the second end 512 within the airfoil 500 aft of the leading edge hybrid cavity 502 and positioned adjacent a pressure side wall 518 of the airfoil 500, as shown in FIG. 5B. The suction side hybrid cavity 506 runs radially between the first end 510 and the second end 512 within the airfoil 500 aft of the leading edge hybrid cavity 502 and positioned adjacent a suction side wall 520 of the airfoil 500, as shown in FIG. 5B. As illustratively shown in FIG. 5A, one or more of the hybrid cavities can include heat transfer augmentation features 522, such as trip strips, pins, chevrons, pedestals, etc., as will be appreciated by those of skill in the art.

As noted above, flow volumes/pressures through the hybrid cavities can be difficult to control, and may typically require one or more metering plates. However, because some hybrid cavities may receive too much air (or air pressure), and others may have too little air (or air pressure), embodiments of the present disclosure are directed to shifting air, airflow, and/or air pressure from one hybrid cavity (e.g., pressure or suction side hybrid cavity) to another hybrid cavity (e.g., leading edge hybrid cavity).

As such, as shown in FIGS. 5A-5B, one or more cross-over holes 524, 526 fluidly connect the airfoil side hybrid cavities (e.g., the pressure side hybrid cavity 504 and the suction side hybrid cavity 506) with the leading edge hybrid cavity 502. Also shown, resupply holes 528 can fluidly connect the cold, interior cavity 508 with the leading edge hybrid cavity 502. As shown in FIG. 5A, first cross-over holes 524 can be angled in a forward (e.g., toward the leading edge 514) and radially outward (e.g., toward the second end 512 of the airfoil 500). That is, the cross-over holes can be arranged to angle in a flow direction (e.g., radially outward) from an airfoil side hybrid cavity 504, 506 into the leading edge cavity 502.

As shown in FIGS. 5A-5B, the first cross-over holes 524 are formed within a first divider rib 530 that extends radially along the airfoil 500 between the first end 510 and the second end 512 and separates the pressure side hybrid cavity 504 from the leading edge hybrid cavity 502. Similarly, second cross-over holes 526 are formed within a second divider rib 532 that extends radially along the airfoil 500 between the first end 510 and the second end 512 and separates the second side hybrid cavity 506 from the leading edge hybrid cavity 502. In some embodiments, the size of the opening of the cross-over holes 524, 526 can be selected to provide a specific flow pattern or characteristic within the airfoil 500. Further, in some embodiments, the spacing or distribution of the cross-over holes 524, 526 within the divider ribs 530, 532 can be substantially uniform along a radial length of the divider ribs. In other embodiments, the concentration or distribution of the cross-over holes 524, 526 within the divider ribs 530, 532 can be non-uniform along a radial length of the divider ribs. For example, in some embodiments, the number of cross-over holes 524, 526 located closer to the first end 510 of the airfoil 500 can be less than the number of cross-over holes 524, 526 located closer to the second end 512 of the airfoil 500. That is, in some embodiments, a density of cross-over holes within the divider ribs can be higher proximate the second end of the airfoil than proximate the first end of the airfoil. Such arrangement can be provided to increase an amount of airflow from the airfoil side hybrid cavities 504, 506 to the leading edge cavity 502 at the second end 512 of the airfoil 500 (e.g., proximate a tip of the airfoil 500).

Figure 6:
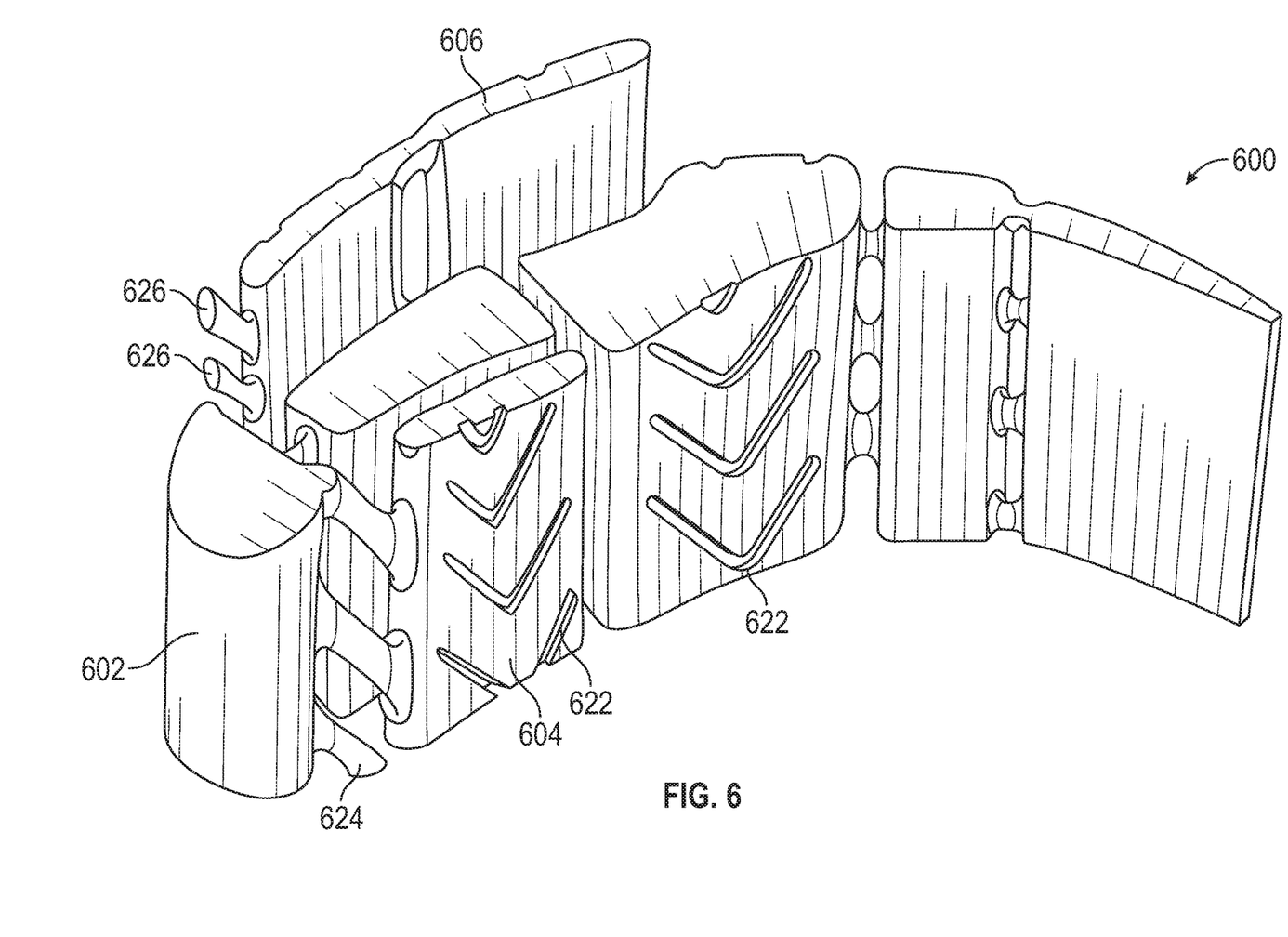
FIG. 6 is a partial schematic illustration of a core structure for forming an airfoil in accordance with an embodiment of the present disclosure.

Turning now to FIG. 6, a partial schematic illustration of a core structure 600 for forming an airfoil body in accordance with an embodiment of the present disclosure is shown. The core structure 600 can be used to form an airfoil substantially similar to that shown and described with respect to FIGS. 5A-5B. The core structure 600 includes a leading edge hybrid core 602, a pressure side hybrid core 604, and a suction side hybrid core 606 (also referred to as "airfoil side hybrid core(s)"). The leading edge hybrid core 602 is connected to the pressure side hybrid core 604 and the suction side hybrid core 606 by one or more cross-over stems 624, 626. The cross-over stems 624, 626 are core structures to form the cross-over holes that will fluidly connect a formed leading edge hybrid cavity to one or both of a formed pressure side hybrid cavity or a formed suction side hybrid cavity. Similar to the above describe definition, as used herein, a "hybrid core" is a core for forming internal cavities of an airfoil that has one wall that is a hot wall (e.g., exterior surface of an airfoil body and exposed to hot, gaspath air) and another wall that is a cold wall (e.g., a wall that is not exposed to the hot gaspath air, and may be an internal or interior wall structure of the airfoil). Also shown in FIG. 6, one or more of the hybrid cores 602, 604, 606 (or other cores, hybrid or non-hybrid of the core structure 600) can include one or more heat transfer augmentation core features 622 for forming various types of heat transfer augmentation features, including, but not limited to trip strips, chevrons, pedestals, etc.

Advantageously, embodiments provided herein are directed to airfoils and cores for making airfoils that enable fluid connection and resupply from airfoil side hybrid cavities to a leading edge hybrid cavity. The resupply of air from the airfoil side hybrid cavities can enable a reduction in the amount of air/air pressure within the airfoil side hybrid cavities while at the same time increases an amount of air/air pressure within a leading edge hybrid cavity. Thus, advantageously, typically used metering plates can be eliminated, thus reducing total weight of airfoils while also provided improved utilization and control of cooling flow within and through airfoils.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An airfoil for a gas turbine engine, the airfoil comprising:
    an airfoil body having a plurality of cavities formed therein, the airfoil extending in a radial direction between a first end and a second end, and extending axially between a leading edge and a trailing edge, wherein the plurality of cavities comprise a leading edge hybrid cavity formed within the airfoil body extending in a radial direction between the first end and the second end of the airfoil body along the leading edge, an airfoil pressure side hybrid cavity located toward the trailing edge of the airfoil body relative to the leading edge hybrid cavity positioned adjacent a pressure side wall of the airfoil body, wherein the airfoil pressure side hybrid cavity extends in a radial direction between the first end and the second end of the airfoil body, and an airfoil suction side hybrid cavity located toward the trialing edge of the airfoil body relative to the leading edge hybrid cavity and positioned adjacent a suction side wall of the airfoil body, wherein the airfoil suction side hybrid cavity extends in a radial direction between the first end and the second end of the airfoil body; and
    a divider rib extending radially between the first end and the second end of the airfoil body along the side wall of the airfoil body between each of the airfoil pressure side hybrid cavity and the airfoil suction side hybrid cavity and the leading edge hybrid cavity; and
    an interior cavity within the airfoil body and located aft of the leading edge hybrid cavity, the interior cavity providing a cold wall to each of the leading edge hybrid cavity and the airfoil side hybrid cavity,
    wherein at least one first cross-over hole is formed within the divider rib to fluidly connect the airfoil pressure side hybrid cavity to the leading edge hybrid cavity,
    wherein at least one second cross-over hole is formed within the divider rib to fluidly connect the airfoil pressure side hybrid cavity to the leading edge hybrid cavity, and
    wherein each of the first cross-over holes and the second cross-over holes are angled in a forward, radial direction and configured to direct an airflow from the respective airfoil side hybrid cavity flows into the leading edge hybrid cavity and enable a reduction in the amount of air/air pressure within the respective airfoil side hybrid cavity while at the same time increasing an amount of air/air pressure within the leading edge hybrid cavity.

2. The airfoil of claim 1, wherein the at least one first cross-over hole comprises a plurality of first cross-over holes formed within the divider rib.

3. The airfoil of claim 2, wherein the plurality of first cross-over holes are distributed uniformly along a radial length of the divider rib.

4. The airfoil of claim 2, wherein a density of first cross-over holes within the divider rib is higher proximate the second end of the airfoil body than proximate the first end of the airfoil body.

5. The airfoil of claim 1, further comprising at least one resupply hole fluidly connecting the interior cavity with the leading edge hybrid cavity.

6. The airfoil of claim 1, further comprising at least one heat transfer augmentation feature within at least one of the leading edge hybrid cavity and at least one of the airfoil pressure side hybrid cavity and the airfoil suction side hybrid cavity.

7. A gas turbine engine comprising:
at least one airfoil having an airfoil body having a plurality of cavities formed therein, the airfoil extending in a radial direction between a first end and a second end, and extending axially between a leading edge and a trailing edge, wherein the plurality of cavities comprise a leading edge hybrid cavity formed within the airfoil body extending in a radial direction between the first end and the second end of the airfoil body along the leading edge, an airfoil pressure side hybrid cavity located toward the trailing edge of the airfoil body relative to the leading edge hybrid cavity positioned adjacent a pressure side wall of the airfoil body, wherein the airfoil pressure side hybrid cavity extends in a radial direction between the first end and the second end of the airfoil body, and an airfoil suction side hybrid cavity located toward the trialing edge of the airfoil body relative to the leading edge hybrid cavity and positioned adjacent a suction side wall of the airfoil body, wherein the airfoil suction side hybrid cavity extends in a radial direction between the first end and the second end of the airfoil body;
a divider rib extending radially between the first end and the second end of the airfoil body along the side wall of the airfoil body between each of the airfoil pressure side hybrid cavity and the airfoil suction side hybrid cavity and the leading edge hybrid cavity; and
an interior cavity within the airfoil body and located aft of the leading edge hybrid cavity, the interior cavity providing a cold wall to each of the leading edge hybrid cavity and the airfoil side hybrid cavity,
wherein at least one first cross-over hole is formed within the divider rib to fluidly connect the airfoil pressure side hybrid cavity to the leading edge hybrid cavity,
wherein at least one second cross-over hole is formed within the divider rib to fluidly connect the airfoil pressure side hybrid cavity to the leading edge hybrid cavity, and
wherein each of the first cross-over holes and the second cross-over holes is angled in a forward, radial direction and configured to direct an airflow from the respective airfoil side hybrid cavity flows into the leading edge hybrid cavity and enable a reduction in the amount of air/air pressure within the respective airfoil side hybrid cavity while at the same time increasing an amount of air/air pressure within the leading edge hybrid cavity.

8. The gas turbine engine of claim 7, wherein the at least one first cross-over hole comprises a plurality of first cross-over holes formed within the divider rib.

9. The gas turbine engine of claim 8, wherein the plurality of first cross-over holes are distributed uniformly along a radial length of the divider rib.

10. The gas turbine engine of claim 8, wherein a density of first cross- over holes within the divider rib is higher proximate the second end of the airfoil body than proximate the first end of the airfoil body.

11. The gas turbine engine of claim 7, further comprising at least one resupply hole fluidly connecting the interior cavity with the leading edge hybrid cavity.

12. The gas turbine engine of claim 7, further comprising at least one heat transfer augmentation feature within at least one of the leading edge hybrid cavity and at least one of the airfoil pressure side hybrid cavity and the airfoil suction side hybrid cavity.

* * * * *